United States Patent
Lam et al.

(10) Patent No.: US 9,678,846 B2
(45) Date of Patent: Jun. 13, 2017

(54) SERVICE DATA RECORD SYSTEM, DATA RECORD METHOD AND ELECTRONIC EQUIPMENT USING THE SAME

(71) Applicant: FLYTECH TECHNOLOGY CO., LTD, Taipei (TW)

(72) Inventors: Tai-Seng Lam, Taipei (TW); Hsiao-Hui Lee, New Taipei (TW); Shuei-Jin Tsai, New Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 116 days.

(21) Appl. No.: 14/521,839

(22) Filed: Oct. 23, 2014

(65) Prior Publication Data

US 2015/0193753 A1     Jul. 9, 2015

(30) Foreign Application Priority Data

Jan. 3, 2014   (TW) .............................. 103100223 A

(51) Int. Cl.
    G06Q 10/10      (2012.01)
    G06F 11/30      (2006.01)
    G07G 1/00       (2006.01)
    G07G 1/12       (2006.01)
    G07F 9/02       (2006.01)
    G06Q 20/20      (2012.01)

(52) U.S. Cl.
    CPC ............ *G06F 11/30* (2013.01); *G06Q 20/202* (2013.01); *G07F 9/026* (2013.01); *G07G 1/0018* (2013.01); *G07G 1/12* (2013.01)

(58) Field of Classification Search
    None
    See application file for complete search history.

(56) References Cited

U.S. PATENT DOCUMENTS

2015/0072663 A1 * 3/2015 Chande ................. G06Q 10/10
                                                     455/414.1

* cited by examiner

*Primary Examiner* — Shay S Glass
(74) *Attorney, Agent, or Firm* — WPAT, PC; Justin King

(57) ABSTRACT

A service data record system (SDR) and a data record method used to record data of an electronic device, such as a point of sale or service (POS) device. The electronic device includes a plurality of electronic units and a control unit. The control unit is used to receive and sift electronic data set of the electronic units. The service data record system includes a storage unit and a micro processing unit, and the micro processing unit is connected with the storage unit and the control unit. The micro processing unit is used to receive the sifted electronic data and transmit all the received electronic data to the storage unit.

4 Claims, 9 Drawing Sheets

SERVICE DATA RECORD SYSTEM, DATA RECORD METHOD AND ELECTRONIC EQUIPMENT USING THE SAME

FIELD OF THE INVENTION

The present invention relates to a service data record system and a data record method, and more particularly relates to an electronic equipment using service data record system and method, e.g. a point of sale or service (POS) device.

BACKGROUND OF THE INVENTION

A point of sale or service device is a widely used electronic device in retail industry nowadays, and is mainly used for managing products and the customer information. Generally speaking, a point of sale or service (POS) device is usually installed on a cashier desk in a convenience store, a shop or a supermarket for displaying information and the sum of price of merchandise purchased by consumers, so it is convenient for a cashier to operate and avoid errors that might occur in the checkout process.

Please refer to FIG. 1, which is a schematic perspective view of a conventional POS device. The POS device 1 comprises a screen body 11, a bracket base 12 and a host computer (not shown), the host computer is set up inside the screen body 11, and assembled with the components of mother board, hard disk, and/or memory, for executing calculation and saving merchandise information, such as the amount of merchandise, the price of merchandise, the stock of merchandise, or the gross profit, etc. In the meanwhile, the cashier can read the merchandise information which is displayed on the screen.

Furthermore, as the consumer demand varies, the additional functions provided by the POS device 1 are increasing, and that is to say, the amount of components inside the POS device 1 or the amount of peripheral devices are getting more. For example, a magnetic stripe reader device 13 is disposed on a lateral side of the screen body for charging a card. Meanwhile, it leads to some difficulties during the repair process. For example, if the POS device malfunctions or fails in booting while being used, it is hard for the user or a service engineer to readily identify the failed one or ones among the large amount of components. Therefore, the service engineer has no choice but to disassemble the POS device 1 and check components one by one to find out the failed one or ones. Actually, it takes much time for trouble shooting.

Furthermore, when the service engineer analyzes the POS device 1, it is hard for the service engineer to accurately find out the reason why the component fails only with the information of factory data, such as the model type, the specification and the manufactured date, etc. On the contrary, if the service engineer can get further more information about the failed component, such as the usage time, the number of uses and the failure rate, etc., the device engineer can carry on the reliability analysis more effectively.

Here are some patents relevant to trouble shooting cases. Wherein, Taiwan utility model Patent Number 291039 discloses a trouble shooting device, used with an electronic equipment having a BIOS, diagnosing which hardware device is breakdown by checking the codes generated by the BIOS during a hardware inspecting process. However, the BIOS is only suitable for the troubling shooting of the hardware relative to the motherboard, and the breakdown status of the display, hard disk, the peripheral device and the information of usage cannot be obtained via the BIOS.

Furthermore, Chinese Patent Number 102023917 discloses a computer system, as shown in FIG. 2. The computer system 2 utilizes an embedded controller 202 disposed therein to couple to a plurality of electronic modules (Dynamic Random Access Memory module 22, frequency generator 23, BIOS 24, input output control chip 25, central processing unit 26) thereof, and the embedded controller 202 is used for writing the collected information S22~S26 of the plurality of electronic modules into the memory module 200 when the computer system 2 is in a power-on state. Therefore, the service engineer may refer to the information saved in the memory module 200 to analyze why the computer system 2 was breakdown. Moreover, the patent further discloses that if the embedded controller is isolated from the computer system 2 as a component disposed in a monitoring device, the embedded controller may sift the collected information S22~S26 of the electronic modules in advance, and then write the sifted information S202 into the memory module.

However, in markets, there are not any data record products, especially designed for being used with a POS device, existing. In view of this, the above issues should be addressed.

SUMMARY OF THE INVENTION

The present invention provides a service data record system and a data record method used with an electronic equipment, pre-designate event information in the electronic equipment could be recorded and stored, so it is convenient for a service engineer to conduct breakdown maintenance.

One objective of this invention is to provide a service data record system for use with an electronic equipment, the electronic equipment having at least one electronic unit and a control unit, the control unit being electronically connected with the at least one electronic unit for receiving an electronic data set from the at least one electronic unit, the service data record system comprising a data record device, and the data record device comprising:

a storage unit; and a micro processing unit electronically connected with the control unit and the storage unit for receiving at least a part of information of the electronic data set and transmitting all the received at least part of information to the storage unit.

In one embodiment, the control unit is an embedded controller; and/or the storage unit is an Electrically Erasable Programmable Read-Only Memory (EEPROM); and/or the electronic equipment is a point of sale or service (POS) device; and/or each of the at least part of data of the electronic data set is a pre-designated event information; and/or the at least one electronic unit comprises at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the at least part of data of the electronic data set comprises at least one selected from a group consisting of a number of uses of the at least one electronic unit, a usage time period of the at least one electronic unit, a manufacture information of the at least one electronic unit, a firmware information of the at least one electronic unit, an unusual information of the at least one electronic unit, a repair information of the at least one electronic unit, a power-on information of the electronic equipment, a power-off information of the electronic equipment, and a sleep information of the electronic equipment.

In one embodiment, the service data record system further comprises a power device for supplying electricity for the service data record system; and/or the service data record system further comprises a terminal display, wherein the terminal display connects to the data record device for showing the at least part of data of the electronic data set; and/or the service data record system further comprises a remote monitoring interface, wherein the remote monitoring interface connects to the data record device for transmitting the at least part of data of the electronic data set to a remote monitoring equipment, and/or for transmitting a control command from the remote monitoring equipment to the service data record system.

In one embodiment, the power device comprises at least one selected from a group consisting of a supply mains, a dry battery, a storage-battery, a Lithium battery, a solar battery and a bio battery; and/or the electronic equipment further comprises a power unit, wherein when the electronic equipment is functional, it is the power unit supplying electricity to the service data record system; and when the electronic equipment is malfunctioned, it is the power device supplying electricity to the service data record system; and/or the power device connects to the micro processing unit, and the micro processing unit transmits a power device data of the power device to the storage unit to be stored; and/or the terminal display connects to either one of the micro processing unit or the storage unit, or both; and/or the micro processing unit transmits a terminal display data of the terminal display to the storage unit to be stored; and/or the terminal display comprises at least one selected from a group consisting of a liquid crystal module (LCM), a Vacuum Fluorescent Display (VFD), and a light emitting device (LED) display device; and/or the electronic equipment further comprises a display unit, wherein when the electronic equipment is functional, the display unit displays the at least part of data of the electronic data set; and when the electronic equipment is malfunctioned, the terminal display displays the at least part of data of the electronic data set; and/or the remote monitoring interface comprises at least one I/O connection part and/or a network connection part.

In one embodiment, the at least one I/O connection part comprises at least one selected from a group consisting of a USB port, a COM port, a Inter-Integrated Circuit (I$^2$C) port, a 3G port, a 4G port, a Bluetooth port, and a WiFi port; and/or the electronic equipment further comprises a network connection unit, wherein when the electronic equipment is functional, the at least part of data of the electronic data set is transmitted to the remote monitoring equipment via the network connection unit and/or the control command of the remote monitoring equipment is transmitted to the service data record system via the network connection unit; and when the electronic equipment is malfunctioned, the at least part of data of the electronic data set is transmitted to the remote monitoring equipment via the network connection part and/or the control command of the remote monitoring equipment is transmitted to the service data record system via the network connection part.

Another objective of this invention is to provide a POS device, comprising:

a display unit for displaying a sale and/or service information;

a host and peripheral device having at least one electronic unit, a control unit and a power unit, the control unit coupling to either one of the at least one electronic unit or the display unit, or coupling to both of the at least one electronic unit and the display unit, for receiving an electronic data set from the at least one electronic unit and/or the display unit, and the power unit being used for supplying electricity to the host and peripheral device; and a service data record (SDR) system comprising a data record device, the data record device comprising:
  a storage unit; and
  a micro processing unit coupling to the control unit and the storage unit; wherein the control unit sifts at least part of data from the electronic data set, the micro processing unit is used for receiving at least part of data sifted out by the control unit, and transmitting all the at least part of data sifted out by the control unit to the storage unit to be stored.

In one embodiment, the control unit is a embedded controller; and/or the storage unit is an Electrically-Erasable Programmable Read-Only Memory (EEPROM); and/or each of the at least part of data of the electronic data set is a pre-designated event information; and/or the at least one electronic unit comprises at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the at least part of data of the electronic data set comprises at least one selected from a group consisting of a number of uses of the at least one electronic unit, a usage time period of the at least one electronic unit, a manufacture information of the at least one electronic unit, a firmware information of the at least one electronic unit, an unusual information of the at least one electronic unit, a repair information of the at least one electronic unit, a power-on information of the electronic equipment, a power-off information of the electronic equipment, and a sleep information of the electronic equipment.

In one embodiment, the service data record device further comprises a power device for supplying electricity for the service data record system; and/or the service data record system further comprises a terminal display, the terminal display connects to the data record device for showing the at least part of data of the electronic data set; and/or the service data record system further comprises a remote monitoring interface, the remote monitoring interface connects to the data record device for transmitting the at least part of data of the electronic data set to a remote monitoring equipment, and/or for transmitting a control command from the remote monitoring equipment to the service data record system.

In one embodiment, the power device comprises at least one selected from a group consisting of a supply mains, a dry battery, a storage-battery, a Lithium battery, a solar battery and a bio battery; and/or the power device connects to the micro processing unit, and the micro processing unit transmits a power device data of the power device to the storage unit to be stored; and/or when the host and peripheral device is functional, it is the power unit supplying electricity to the service data record system; and when the host and peripheral device is malfunctioned, it is the power device supplying electricity to the service data record system; and/or the terminal display connects to either one of the micro processing unit or the storage unit, or both; and/or the micro processing unit transmits a terminal display data of the terminal display to the storage unit to be stored; and/or the terminal display comprises at least one selected from a group consisting of a liquid crystal module (LCM), a Vacuum Fluorescent Display (VFD), and a light emitting device (LED) display device; and/or when the host and peripheral device is functional, the display unit displays the at least part of data of the electronic data set; and when the host and peripheral device is malfunctioned, the terminal display displays the at least part of data of the electronic data set; and/or the remote monitoring interface comprises at least one I/O connection part and/or a network connection part.

In one embodiment, the at least one I/O connection part comprises at least one selected from a group consisting of a USB port, a COM port, a Inter-Integrated Circuit ($I^2C$) port, a 3G port, a 4G port, a Bluetooth port, and a WiFi port; and/or the host and peripheral device further comprises a network connection unit, wherein when the host and peripheral device is functional, the at least part of data of the electronic data set is transmitted to the remote monitoring equipment via the network connection unit; and/or the control command of the remote monitoring equipment is transmitted to the service data record system via the network connection unit; and when the host and peripheral device is malfunctioned, the at least part of data of the electronic data set is transmitted to the remote monitoring equipment via the network connection part; and/or the control command of the remote monitoring equipment is transmitted to the service data record system via the network connection part.

Another objective of this invention is to provide a service data record (SDR) system used with an electronic equipment, the electronic equipment having at least a electronic unit and a control unit, the control unit being coupling to at least one electronic unit for receiving a electronic data set of at least one electronic unit, the control unit having a control connection part, the service data record system comprising a data record device, and the data record device comprising:

a storage unit having a storage connection part, and a micro processing unit having a first micro processing unit connection part and a second micro processing unit connection part, the first micro processing unit connection part connecting to the control connection part, and the second micro processing unit connection part connecting to the storage connection part;

wherein, at least part of data of the electronic data set output from the control unit is transmitted to the micro processing unit via the control connection, the first micro processing unit connection part sequentially and the micro processing unit in sequence, and the at least part of data received by the micro processing unit is all transmitted to the storage unit to be stored via the second micro processing unit connection part and the storage connection part sequentially.

In one embodiment, the control unit is a embedded controller; and/or the storage unit is an Electrically Erasable Programmable Read-Only Memory (EEPROM); and/or the electronic equipment is a point of sale or service (POS) device; and/or each of the at least part of information of the electronic data set is a pre-designated event information; and/or the at least one electronic unit comprises at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the at least part of information of the electronic data set comprises at least one selected from a group of a number of uses of the at least one electronic unit, a usage time period of the at least one electronic unit, a manufacture information of the at least one electronic unit, a firmware information of the at least one electronic unit, an unusual information of the at least one electronic unit, a repair information of the at least one electronic unit, a power-on information of the electronic equipment, a power-off information of the electronic equipment, and a sleep information of the electronic equipment.

In one embodiment, the service data record further comprises a power device for supplying electricity for the service data record system; and/or the service data record system further comprises a terminal display, wherein the terminal display connects to the data record device for showing the at least part of information of the electronic data set; and/or the service data record system further comprises a remote monitoring interface, wherein the remote monitoring interface connecting to the data record device for transmitting the at least part of data of the electronic data set to a remote monitoring equipment, and/or for transmitting a control command from the remote monitoring equipment to the service data record system.

In one embodiment, the power device comprises at least one selected from a group consisting of a supply mains, a dry battery, a storage-battery, a Lithium battery, a solar battery and a bio battery; and/or the electronic equipment further comprises a power unit, wherein when the electronic equipment is functional, it is the power unit supplying electricity to the service data record system; and when the electronic equipment is malfunctioned, it is the power device supplying electricity to the service data record system; and/or the power device connects to the micro processing unit, and the micro processing unit transmits a power device data of the power device to the storage unit to be stored; and/or the terminal display connects to either one of the micro processing unit or the storage unit, or both; and/or the micro processing unit transmits a terminal display data of the terminal display to the storage unit to be stored; and/or the terminal display comprises at least one selected from a group consisting of a liquid crystal module (LCM), a Vacuum Fluorescent Display (VFD), and a light emitting device (LED) display device; and/or the electronic equipment further comprises a display unit, wherein when the electronic equipment is functional, the display unit displays the at least part of data of the electronic data set; and when the electronic equipment is malfunctioned, the terminal display displays the at least part of data of the electronic data set; and/or the remote monitoring interface comprises at least one I/O connection part and/or a network connection part.

In one embodiment, the at least one I/O connection part comprises at least one selected from a group consisting of a USB port, a COM port, a Inter-Integrated Circuit ($I^2C$) port, a 3G port, a 4G port, a Bluetooth port, and a WiFi port; and/or the electronic equipment further comprises a network connection unit, wherein when the electronic equipment is functional, the at least part of data of the electronic data set is transmitted to the remote monitoring equipment via the network connection unit and/or the control command of the remote monitoring equipment is transmitted to the service data record system via the network connection unit; and when the electronic equipment is malfunctioned, the at least part of data of the electronic data set is transmitted to the remote monitoring equipment via the network connection part; and/or the control command of the remote monitoring equipment is transmitted to the service data record system via the network connection part.

The other objective of this invention is to provide a data record method for recording an electronic equipment data, comprising:

utilizing a control unit of the electronic equipment to receive an electronic data set of at least one electronic unit from the electronic equipment and to sift the at least part of data from the electronic data set, and utilizing a micro processing unit to receive the at least part of data sifted out by the control unit, and to transmit all the at least part of data sifted out by the control unit to a storage unit for being stored.

The data record method according to claim 16, wherein the control unit is an embedded controller; and/or the storage unit is an Electrically Erasable Programmable Read-Only Memory (EEPROM); and/or the electronic equipment is a point of sale or service (POS) device; and/or each of the at least part of data of the electronic data set is a pre-designated event information; and/or the at least one electronic unit comprises at least one selected from a group consisting of a central processing unit, a mother board, a function board, a daughter board, a memory, a display, a hard disk, a CD-ROM, an adapter, a scanner, a thermal print device, a USB device, a power supply, a touch sensor, a magnetic stripe reader, a fingerprint recognition device, an information button (iButton), a radio frequency identification device, a card reader and an input device; and/or the at least part of data of the electronic data set comprises at least one selected from a group consisting of a number of uses of the at least one electronic unit, a usage time period of the at least one electronic unit, a manufacture information of the at least one electronic unit, a firmware information of the at least one electronic unit, an unusual information of the at least one electronic unit, a repair information of the at least one electronic unit, a power-on information of the electronic equipment, a power-off information of the electronic equipment, and a sleep information of the electronic equipment.

In one embodiment, the data record method further comprises:

utilizing a power device to supply electricity to the micro processing unit; and/or utilizing a terminal display to show the at least part of data of the electronic data set; and/or utilizing a remote monitoring interface for transmitting the at least part of data of the electronic data set to a remote monitoring equipment, and/or for transmitting a control command of the remote monitoring equipment to the service data record system.

In one embodiment, the power device comprises at least one selected from a group consisting of a supply mains, a dry battery, a storage-battery, a Lithium battery, a solar battery and a bio battery; and/or the electronic equipment further comprises a power unit, wherein when the electronic equipment is functional, it is the power unit supplying electricity to the service data record system; and when the electronic equipment is malfunctioned, it is the power device supplying electricity to the service data record system; and/or the power device connects to the micro processing unit, and the micro processing unit transmits a power device data of the power device to the storage unit to be stored; and/or the terminal display connects to either one of the micro processing unit or the storage unit, or both; and/or the micro processing unit transmits a terminal display data of the terminal display to the storage unit to be stored; and/or the terminal display comprises at least one selected from a group consisting of a liquid crystal module (LCM), a Vacuum Fluorescent Display (VFD), and a light emitting device (LED) display device; and/or the electronic equipment further comprises a display unit, wherein when the electronic equipment is functional, the display unit displays the at least part of data of the electronic data set; and when the electronic equipment is malfunctioned, the terminal display displays the at least part of data of the electronic data set; and/or the remote monitoring interface comprises at least one I/O connection part and/or a network connection part.

In one embodiment, the at least one I/O connection part comprises at least one selected from a group consisting of a USB port, a COM port, a Inter-Integrated Circuit ($I^2C$) port, a 3G port, a 4G port, a Bluetooth port, and a WiFi port; and/or the electronic equipment further has a network connection unit, when wherein the electronic equipment is functional, the at least part of data of the electronic data set is transmitted to the remote monitoring equipment via the network connection unit; and/or the control command of the remote monitoring equipment is transmitted to the micro processing unit via the network connection unit; and when the electronic equipment is malfunctioned, the at least part of data of the electronic data set is transmitted to the remote monitoring equipment via the network connection part; and/or the control command of the remote monitoring equipment is transmitted to the micro processing unit via the network connection part.

DETAILED DESCRIPTION OF THE PREFERRED EMBODIMENT

A service data record (SDR) system according to the present invention may be used with various kinds of electronic equipments, in addition to a point of sale or service (POS) device, for recording various designated event information of the electronic equipments. The details will be described later with reference to POS devices given as examples only. With the service data record system, it is easy for a user to conduct routine maintenance, and also convenient for a service engineer to conduct breakdown maintenance and reliability analysis.

Figure 1:
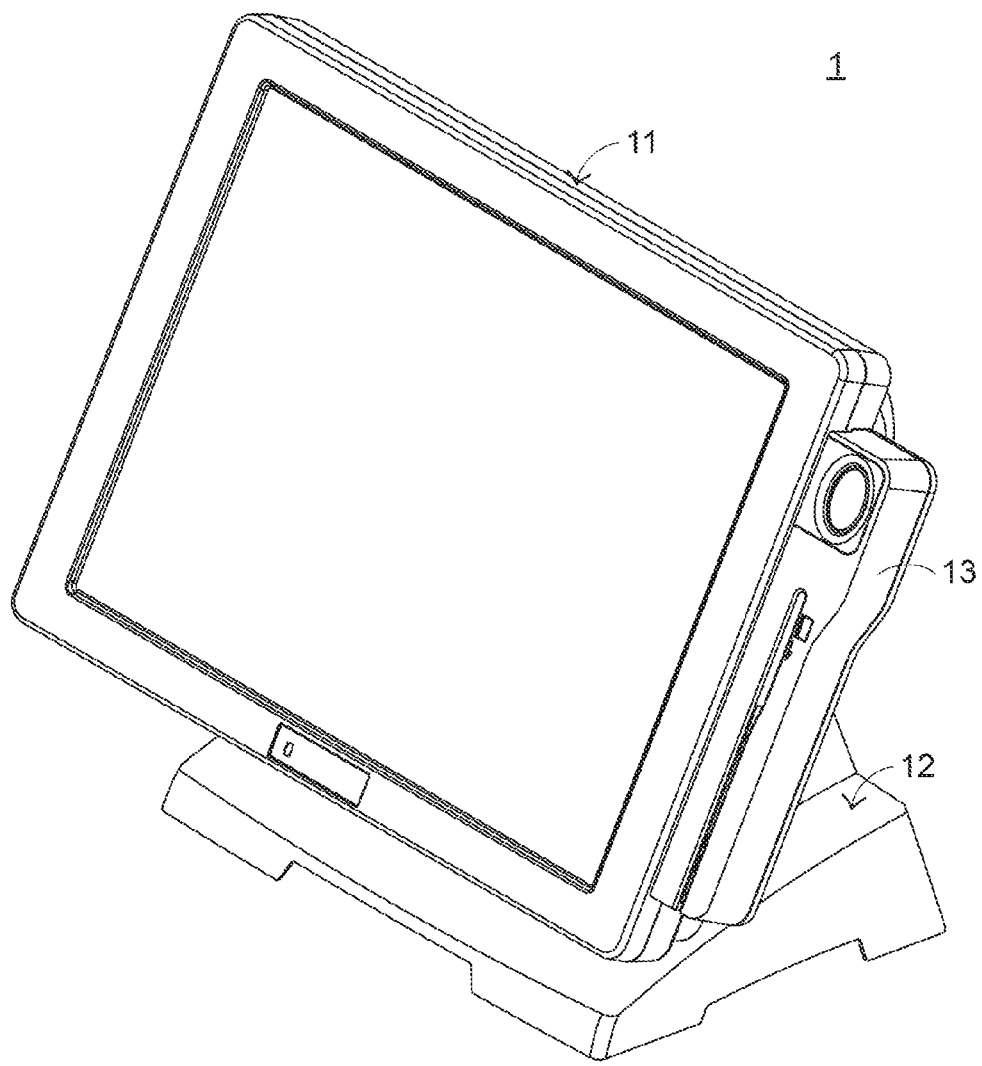
FIG. 1 is a schematic diagram depicting a conventional POS device.
Figure 2:
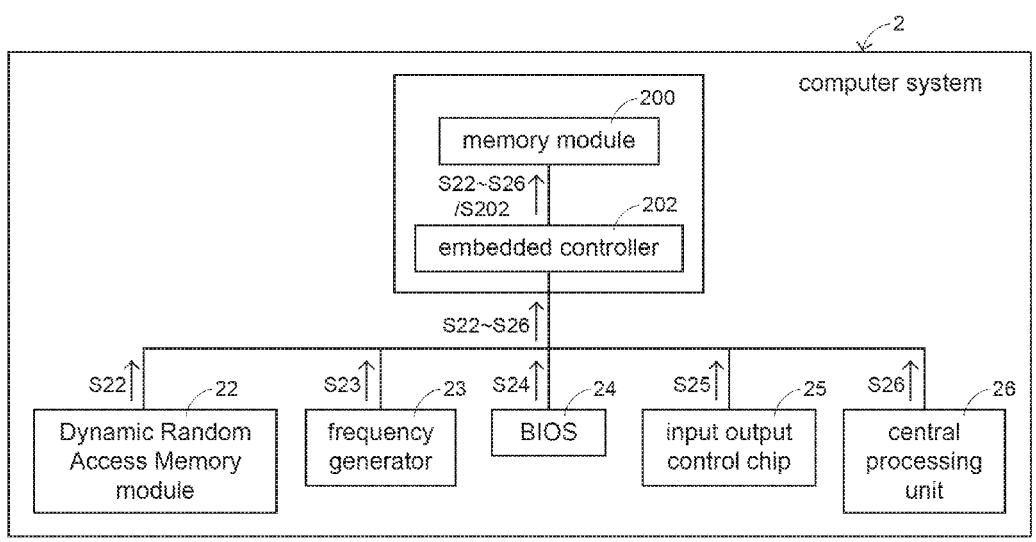
FIG. 2 is a block diagram illustrating a computer system disclosed in Chinese Patent Number 102023917.
Figure 3:
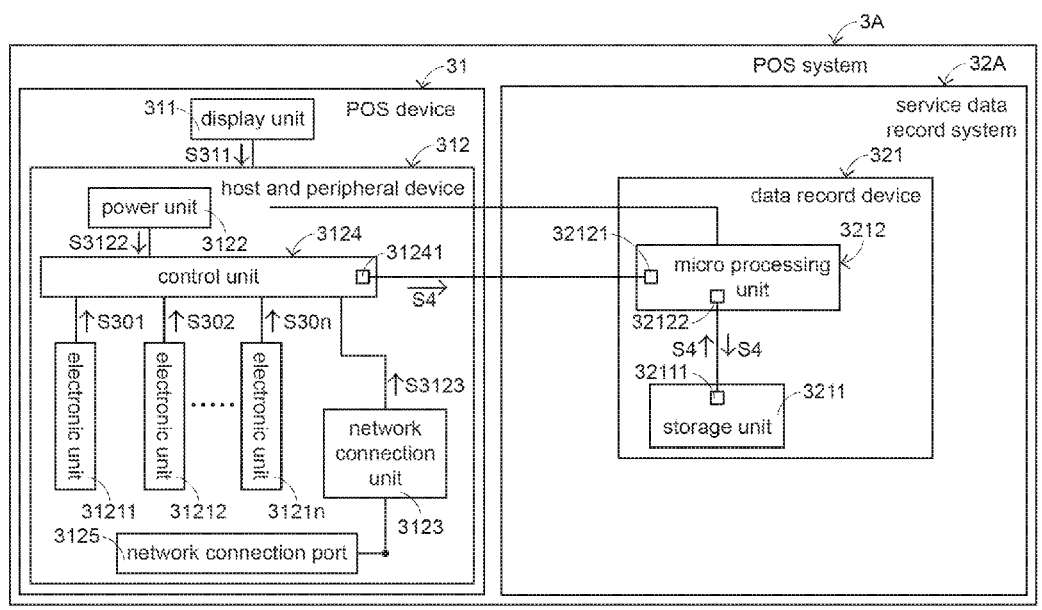
FIG. 3 is a block diagram illustrating a first embodiment of a POS system according to the present invention.

Please refer to FIG. 3. FIG. 3 is a block diagram illustrating a first embodiment of a POS system according to the present invention. The POS system 3A comprises a POS device 31 and a service data record system 32A, and the POS device 31 comprises a display unit 311 and a host and peripheral device 312. The host and peripheral device 312 has a plurality of electronic units 31211~3121$n$, a power unit 3122, a network connection unit 3123 and a control unit 3124. The power unit 3122 is used to supply electricity to the POS device 31 in operation, and each of the electronic units 31211~3121$n$ provides a specific function, for example, executing calculation and storing merchandise information, such as quantity, price, stock and/or the gross profit, etc. of each item of merchandise. In the meantime, the cashier can watch these merchandise information that is displayed on the display unit 311.

In this embodiment, these electronic unit 31211~3121$n$ include a central processing unit, a mother board, a function board, a daughter board, a memory (such as a Flash Memory, a Read-Only Memory, or a Random Access Memory), a display, a hard disk (such as a conventional disk or a Solid-State Disk), a CD-ROM, an adapter, a scanner, a thermal print device, a USB device, a power supply, a touch sensor, a magnetic stripe reader, a fingerprint recognition device, an information button (iButton), a radio frequency identification device, a card reader and/or an input device (such as a keyboard or a mouse). The aforesaid functions and the working principles of the hardware elements are familiar to the skilled in the art, so it will not be redundantly described herein. It is to be noted that the electronic elements 31211~3121$n$ included in the host and the peripheral device 312 are not limited to the items as foresaid.

Furthermore, the control unit 3124 is electrically connected with the power unit 3122, the network connection unit 3123, the display unit 311 and at least part of the electronic units 31211~3121$n$, and used to control the signal timing of each hardware element so as to manage the entire POS device 31. For example, the control unit 3124 is responsible for keyboard control, and standby and sleep control of the POS device 31. In this embodiment, the control unit 3124 is an embedded controller, which has been widely used in many electronic equipments as an important signal processing element, and well known to people skilled in the art.

On the other hand, the service data record system 32A comprises a data record device 321 for recording and storing every pre-designated event information which is relevant to the POS device 31. The data record device 321 has a storage unit 3211 and a micro processing unit 3212, the storage unit 3211 has a storage connection part 32111, and the micro processing unit has a first micro processing unit connection part 32121 and a second micro processing unit connection part 32122. The control unit 3124 has a control connection part 31241, and the first micro processing unit connection part 32121 and the second micro processing unit connection part 32122 are respectively connected to the control connection part 31241 of the control unit 3124 and the storage connection part 32111 of the storage unit 3211. In this embodiment, the storage unit 3211 is, but not limited to be, an EEPROM.

Figure 4:
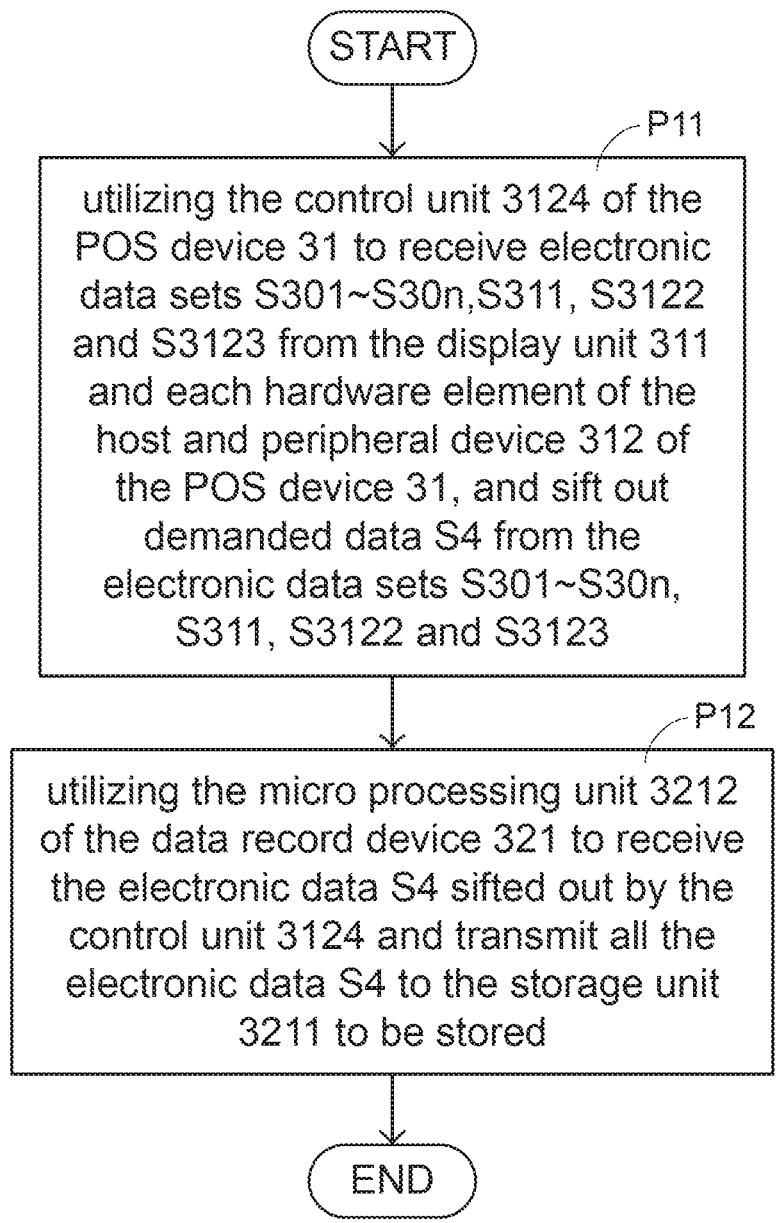
FIG. 4 is a flowchart of a data record method according to an embodiment of the present invention.

Please refer to FIG. 4. FIG. 4 is a flowchart of a data record method according to an embodiment of the present invention. The data record method comprises:

Step 1: utilizing the control unit 3124 of the POS device 31 to receive electronic data sets S301~S30$n$, S311, S3122 and S3123 from the display unit 311 and each hardware element of the host and peripheral device 312 of the POS device 31, and sift out demanded data S4 from the electronic data sets S301~S30$n$, S311, S3122 and S3123. In this step, since the control unit 3124 is electronically connected to the power unit 3122, the network connection unit 3123, the display unit 311 and the electronic units 31211~3121$n$ and is responsible for the signal processing of each hardware element, the control unit 3124 manages to receive all the electronic data sets S301~S30$n$, S311, S3122 and S3123 from the power unit 3122, the network connection 3123, the display unit 311 and the electronic units 31211~3121$n$ so as to conduct a sift process by individually diagnosing whether the received electronic data sets are pre-designated event information; and Step 2: utilizing the micro processing unit 3212 of the data record device 321 to receive the electronic data S4 sifted out by the control unit 3124 and transmit all the electronic data S4 to the storage unit 3211 to be stored. In this step, all the electronic data sifted out in Step 1 are received as the electronic data S4 and determined to be pre-designated event information, and all the pre-designated event information can be saved in the storage unit 3211.

In this embodiment, the pre-designated event information, i.e. the sifted electronic data S4, may be associated with each the hardware elements connected with the control unit 3124, and include number of uses (e.g. accumulated touch times of a touch sensor), usage time period (e.g. accumulated power-on time period of the display 311), manufacture information (e.g. manufacture date), firmware information (e.g. firmware version, number of times of updating firmware, and time point for updating firmware), unusual information (e.g. exception code of BIOS), and repair information (e.g. repair time point and repair frequency), etc. The pre-designated event information may be alternatively or additionally associated with the POS device 31, and include power-on (e.g. accumulated power-on time period, accumulated booting number, and power-on triggering manner), power-off information (e.g. accumulated number of shutdown times, and power-off triggering manner), and sleep information (e.g. accumulated number of sleep times, and sleep-triggering manner). The pre-designate information may further be associated with any other suitable information and is not limited to the above described. People skilled in the art may proceed with any other equivalent designs according to practical demands.

It should be noted herein that data flow of each of the pre-designated event information is starting from the corresponding hardware elements, and then being transmitted through the control unit 3124, the control connection part 31241, the first micro processing unit connection part 32121, the micro processing unit 2312, the second micro processing unit connection part 32122, the storage connection part 32111 to the storage unit 3211.

According to the above, since the pre-designated event information has been saved in the storage unit 3211, a service engineer is able to conduct breakdown maintenance and reliability analysis by referring to the contents in the storage unit 3211, regardless whether the POS device 31 can be booted or can not be booted.

Figure 5:
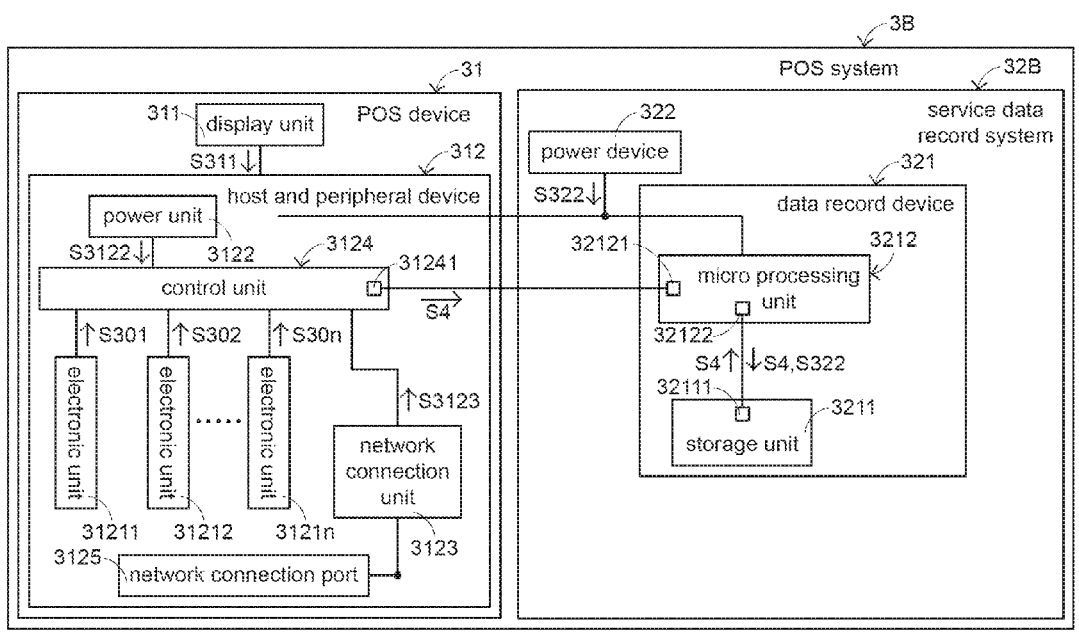
FIG. 5 is a block diagram illustrating a second embodiment of a POS system according to the present invention.

Please refer to FIG. 5. FIG. 5 is a block diagram illustrating a second embodiment of a POS system according to the present invention. The POS system 3B in this embodiment is similar to that described in the first embodiment with reference to FIG. 3. The difference between the POS system 3B in the second embodiment and the POS system 3A in the first embodiment is that the service data record system 32B included in the POS system 3B further comprises a power device 322 for supplying electricity to the service data record system 32B.

Preferably, but not limitedly, the power device 322 may be a device of a supply mains, a dry battery, a storage-battery, a Lithium battery, a solar battery or a bio battery, and the micro processing unit 3212 of the data record device 321 is electrically connected to the power device 322. When the POS device 31 is functional and stays in a power-on and operating state, the power device 3122 of the POS device 31 supplies electricity to the entire POS system 3B. Accordingly, the micro processing unit 3212 of the data record device 321 uses the electricity which is supplied by the power unit 3122. When the POS device 31 is malfunctioned, so that the POS device 31 is breakdown and the power unit 3122 does not work, the power device 322 of the service data record system 32B then provides backup electricity supplied to the service data record system 32B. Therefore, even if the POS device 31 is breakdown unexpectedly, the service engineer may still read the data saved in the storage unit 3211 of the data record device 321.

Furthermore, in this embodiment, the micro processing unit 3212 of the data record device 321 may receive the power device data S322, which contains, for example, the information of the accumulated number of uses or the dump energy, and transmit it to the storage unit 3211 for being stored.

Figure 6:
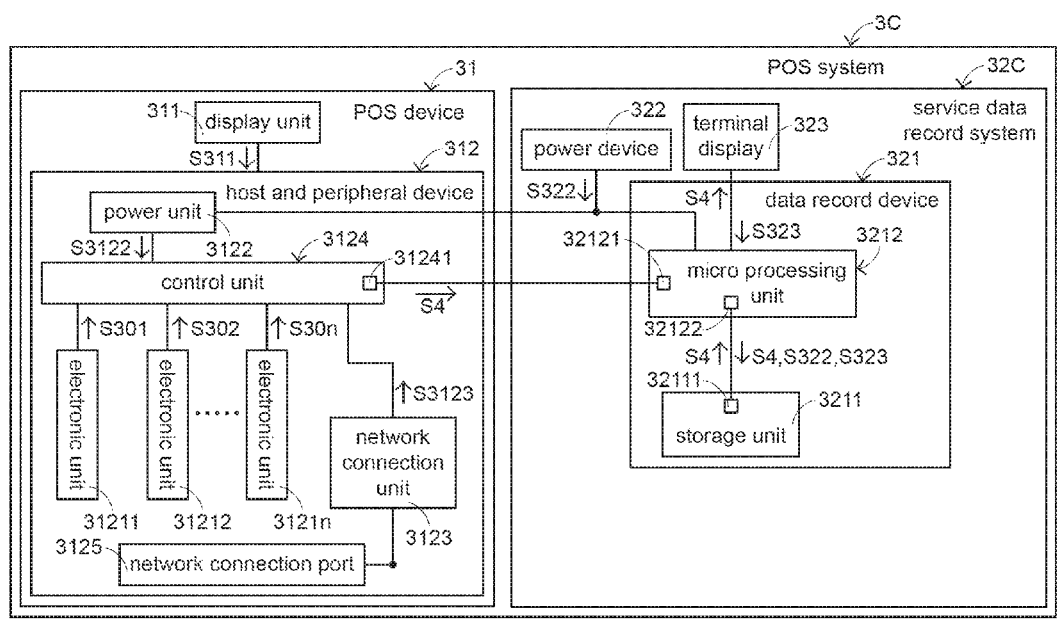
FIG. 6 is a block diagram illustrating a third embodiment of a POS system according to the present invention.

Please refer to FIG. 6. FIG. 6 is a block diagram illustrating a third embodiment of a POS system according to the present invention. The POS system 3C in this embodiment is similar to the POS system 3B in the second embodiment. The difference between the third embodiment and the second embodiment is that the service data record system 32C further comprises a terminal display 323, and the terminal display 323 connects to the data record device 321 for displaying pre-designated event information. Preferably, but not limitedly, the terminal display 323 may include at least one of a liquid crystal module (LCM), a Vacuum Fluorescent Display (VFD), and a light emitting device (LED) display device.

Furthermore, in this embodiment, the terminal display 323 connects to the micro processing unit 3212 of the data record device 321. When the micro processing unit 3212 receives the electronic data S4 sifted out by the control unit 3124 of the POS device 31, the terminal display shows the information. Certainly, the micro processing unit 3212 may read the electronic data S4 saved in the storage unit 3211 and transmit it to the terminal display 323. As a result, the end user, such as an cashier, may make simple repair according to the contents shown on the terminal display 323 or may report the contents shown on the terminal display 323 to the service engineer who is not present (not near the terminal display 323) when the POS device 31 is malfunctioned. It facilitates the preparation of the service engineer for repair or maintenance as well as remote instruction from the service engineer to repair or maintenance according to the contents shown on the terminal display 323.

It is to be noted that the aforesaid descriptions of embodiment are for illustrations only, and the invention is not limited to the embodiments and examples. People skilled in the art may proceed with any other equivalent designs according to practical demands. For example, the designer may alternatively connect the terminal display to the storage unit of the data record device. Therefore, the terminal display may show the electronic data which is saved in the storage unit.

It should be noted that since the service data record system 32C is provided with a power device 322, when the POS device 31 is malfunctioned, for example the POS device 31 is crashed, causing the power unit 3122 does not work, the power device 322 of the service data record system 32C is able to provide emergency electricity to the service data record system 32C. Therefore, the terminal display 323 can still show the pre-designated event information S4 even if the POS device 31 is broken down suddenly.

Furthermore, in this embodiment, the micro processing unit 3212 of the data record device 321 may receive a terminal display data S323 from the terminal display 323, e.g a number of uses and the accumulated power-on time period, and then transmit it to the storage unit 3211 to be stored.

Figure 7:
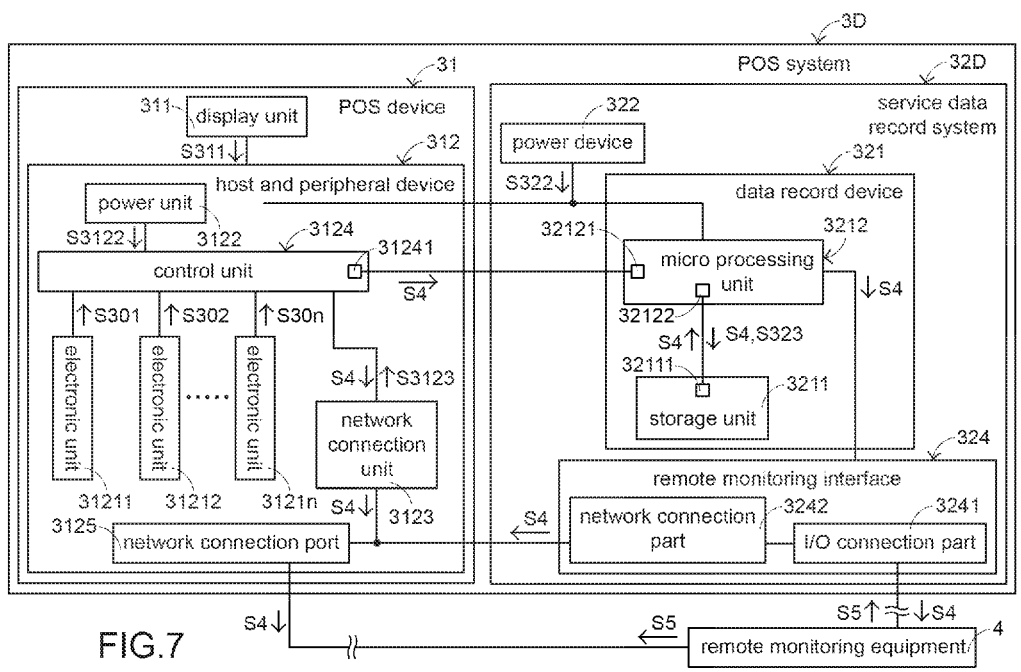
FIG. 7 is a block diagram illustrating a fourth embodiment of a POS system according to the present invention.

Please refer to FIG. 7. FIG. 7 is a block diagram illustrating a fourth embodiment of a POS system of the present invention. The POS system 3D in this embodiment is similar to the POS system 3B in the second embodiment. The difference between this embodiment and the second embodiment is that the service data record system 32D further comprises a remote monitoring interface 324, which is connected with the data record device 321 for transmitting the pre-designated event information S4 outwards to a remote monitoring equipment.

Furthermore, in this embodiment, the remote monitoring interface 324 comprises a plurality of I/O connection part 3241 and a network connection part 3242, and connects to the micro processing unit 3212 of the data record device 321. When the micro processing unit 3212 receives the electronic data S4 sifted out by the control unit 3124 of the POS device 31, the electronic data S4 may be transmitted to the remote monitoring equipment 4 through the remote monitoring interface 324, or the electronic data S4 saved in the storage unit 3211 may be transmitted to the remote monitoring equipment 4 through the remote monitoring interface 324 by the micro processing unit 3212. With such an arrangement, the service engineer who is not present there can still monitor the POS device 31 anytime. When the POS device is malfunctioned, the service engineer can draw up a repair plan according to the contents realized from the remote monitoring equipment, and the service engineer, if absent, can teach the end user how to repair it according to the contents realized from the remote monitoring equipment 4.

It is to be noted that the present invention is not limited to the aforesaid descriptions and embodiments. People skilled in the art may proceed with any other equivalent designs according to practical demands. For example, the remote monitoring interface may be altered to connect to the storage unit of the data record device, and therefore, the remote monitoring equipment may receive the electronic data which is saved in the storage unit through the remote monitoring interface.

It should be noted herein is that the service data record system 32D has a power device. When the POS device 31 is malfunctioned, for example the POS device 31 is crashed and causing the power device not work, the power device 322 of the service data record system 32C could be an emergency energy for providing electricity to the service data record system 32C. Therefore, the remote monitoring equipment 4 can show the pre-designated event information S4 even if the POS device 31 is broken down suddenly.

Further, the remote service engineer may remotely control the POS system 3D via the remote monitoring interface 324, in other words, the control command S5 from the remote monitoring equipment 4 may be transmitted to the service data record system 32D via the remote monitoring interface 324. For example, the service engineer may set up the parameter via the remote monitoring equipment 4, thereby the control command S5 corresponding to the setting may be transmitted to the micro processing unit 3212 via the remote monitoring interface 324 in order to make the micro processing unit 3212 execute a corresponding control process.

In addition, in this embodiment, the I/O connection part 3241 may be a USB port, a COM port, a Inter-Integrated Circuit (I²C) port, a 3G port, a 4G port, a Bluetooth port, or a WiFi port, but it should not be limited herein.

Preferably, a network connection part of the service data record system 32D and the network connection unit 3123 of the POS device 31 have the same network connection port 3125. When the POS device 31 works normally, e.g. in a power-on status, the electronic data S4 may be transmitted to the remote monitoring equipment 4 via the network connection unit 3123 of the POS device 31. Similarly, the control command S5 from the remote monitoring equipment 4 may be transmitted to POS system 3D via the network connection unit 3123 of the POS device 31.

When the POS device 31 is malfunctioned, e.g. the POS device 31 is breakdown and causing the power unit 3122 or the networking connection unit 3123 not working, the micro processing unit 3212 may transmit the electronic data S4 to the remote monitoring equipment 4 via the network connection part 3242 of the service data record system 32D; or the micro processing unit 3212 may transmit the electronic data S4 saved in the storage unit 3211 to the remote monitoring equipment 4 via the network connection part 3243 of the service data record system 32D. Similarly, the control command S5 from the remote monitoring equipment 4 may be transmitted to the POS system 3D via the network connection part 3242 of the service data record system 32D.

Figure 8:
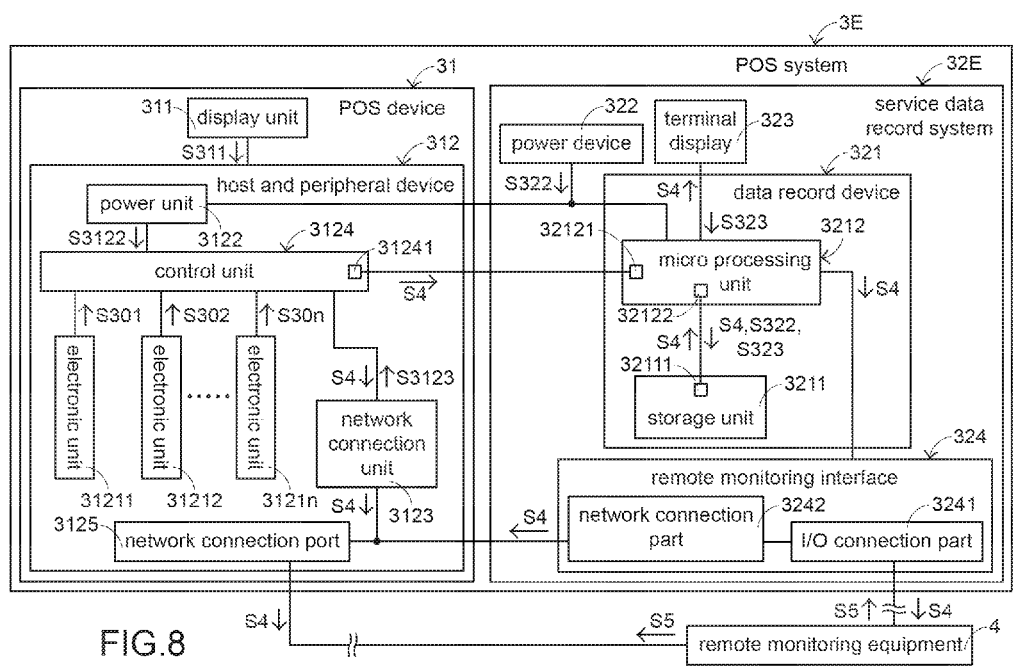
FIG. 8 is a block diagram illustrating a fifth embodiment of a POS system according to the present invention.

The following is to describe a fifth embodiment of the POS system according to the present invention. Please refer to FIG. 8. FIG. 8 is a block diagram illustrating a fifth embodiment of a POS system of the present invention. The POS system 3E in this embodiment is similar to the POS system 3C or 3D in the third or fourth embodiment. The difference between this embodiment and the third and fourth embodiments is that the service data record system 32E comprises both the terminal display 323 and the remote monitoring interface 324.

Figure 9:
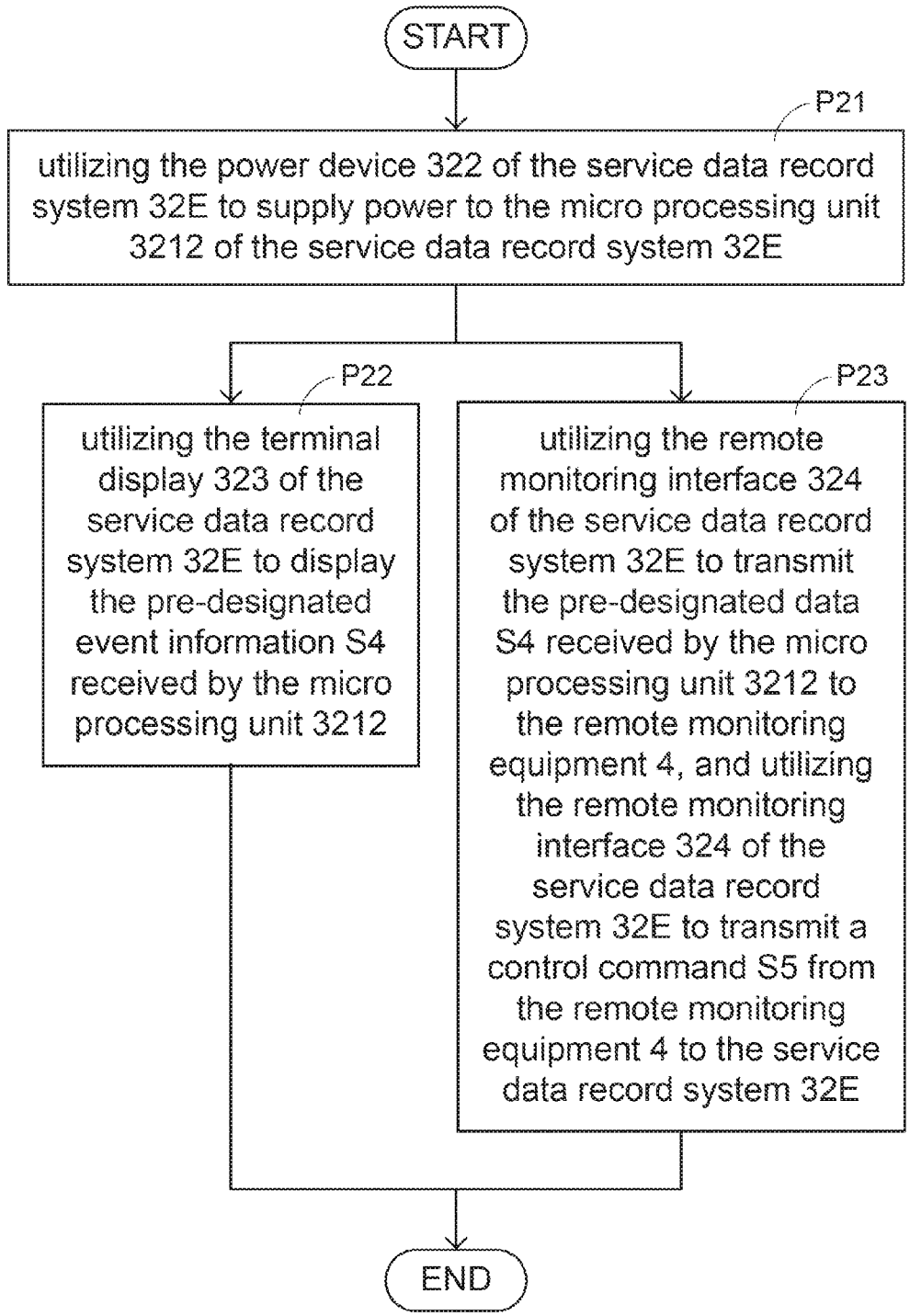
FIG. 9 is a flowchart of a data record method applicable to the POS system shown in FIG. 8 according to the present invention.

Please refer to FIG. 9. FIG. 9 is a flowchart of a data record method executed by the POS system shown in FIG. 8 of the present invention. The data recording method shown in FIG. 9 is a data display method executed when the POS device 31 malfunctioned, comprising:

Step P1: utilizing the power device 322 of the service data record system 32E to supply power to the micro processing unit 3212 of the service data record system 32E;

Step P2: utilizing the terminal display 323 of the service data record system 32E to display the pre-designated event information S4 received by the micro processing unit 3212, wherein the step P2 has been described in detail in the third embodiment of the POS system 3C of the present invention; and Step P3: utilizing the remote monitoring interface 324 of the service data record system 32E to transmit the pre-designated data S4 received by the micro processing unit 3212 to the remote monitoring equipment 4, and utilizing the remote monitoring interface 324 of the service data record system 32E to transmit a control command S5 from the remote monitoring equipment 4 to the service data record system 32E, wherein the step P3 has been described in detail in the fourth embodiment of the POS system 3D of the present invention.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A service data record system for use with a POS device, the POS device having at least one electronic unit and a control unit, the control unit being electronically connected with the at least one electronic unit for receiving an electronic data set from the at least one electronic unit and transmitting at least a part of the electronic data set to a remote monitoring equipment via first network connection, the service data record system comprising a data record device for saving data from the POS device, which are accessible for breakdown maintenance when the POS device is inoperable, wherein the data record device comprises:
  a storage unit;
  a micro processing unit electronically connected with the control unit and the storage unit for receiving at least a part of data of the electronic data set and transmitting all the received at least part of data to the storage unit,
  a remote monitoring interface electrically connected to the data record device for transmitting the at least part of data of the electronic data set from the service data record system to a remote monitoring equipment, and transmitting a control command from the remote monitoring equipment to the micro processing unit of the service data record system via I/O connection of the data record device and/or second network connection to have the micro processing unit execute a corresponding control process when the POS device is inoperable; and
  a power device for supplying electricity to the service data record system when the POS device is inoperable in order to perform transmission of the at least part of data and/or the control command between the service data record system and the remote monitoring equipment for breakdown maintenance of the inoperable POS device.

2. The service data record system according to claim 1, wherein
  the at least part of data of the electronic data set comprises at least one selected from a group consisting of a number of uses of the at least one electronic unit, a usage time period of the at least one electronic unit, a manufacture information of the at least one electronic unit, a firmware information of the at least one electronic unit, an unusual information of the at least one electronic unit, a repair information of the at least one electronic unit, a power-on information of the POS device, a power-off information of the POS device, and a sleep information of the POS device.

3. The service data record system according to claim 1, further comprising
a terminal display electrically connected to the data record device for showing the at least part of data of the electronic data set when the POS device (31) is inoperable.

4. The service data record system according to claim 1, wherein the first network connection and the second network connection have a common network connection port disposed in the POS device.

* * * * *